Patented Aug. 18, 1931

1,819,103

UNITED STATES PATENT OFFICE

LEOPOLD LASKA AND ARTHUR ZITSCHER, OF OFFENBACH-ON-THE-MAIN, GERMANY, ASSIGNORS TO GENERAL ANILINE WORKS, INC., OF NEW YORK, N. Y., A CORPORATION OF DELAWARE

MANUFACTURE OF NEW AZODYESTUFFS

No Drawing. Application filed August 27, 1928, Serial No. 302,439, and in Germany September 5, 1927.

We have found that new and valuable azodyestuffs are obtained by combining any diazo-, tetrazo- or diazoazo- compound containing no free sulfonic nor carboxylic acid groups with bis-(2'hydroxy-3'-naphthoyl)-arylene-1.4-diamines containing one substituent each in ortho position to the aminogroups and corresponding probably to the general formula

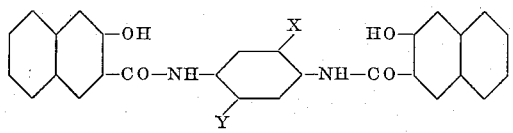

wherein X and Y, being equal or different, mean substituents of the group comprising alkyl, alkoxy and halogen.

The new dyestuffs of the probable general formula

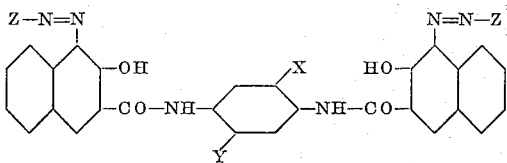

wherein X and Y have the aforesaid signification and Z means the residue of any diazo-, tetrazo-, or diazoazo-compound of the benzene-, naphthalene or anthraquinone series containing no free sulfonic nor carboxylic acid groups, are when dry reddish to blackish powders, soluble in concentrated sulfuric acid with a bluish-red to bluish-green color. When mixed with the usual substrata they yield valuable color lakes. When produced on the vegetable fiber by the ice-color method, the dyeings and printings obtained are of a dark red, garnet or violet to black shade according to the diazo-compound used; they are distinguished among the hitherto known combinations derived from bis-(2'-hydroxy-3'-naphthoyl)-arylene-diamines by an especially increased fastness to light.

The bis-(2'-hydroxy-3'-naphthoyl)-arylene-1.4-diamines substituted in 2 and 5 positions which are used in our process are unknown hitherto and may be prepared by condensing 2-hydroxy-3-naphthoic acid (or a derivative thereof) with correspondingly substituted 1.4-aryldiamines, for instance by heating these components with a dehydrating agent in a suitable organic diluent as indicated in U. S. Patent 1,101,111.

In order to further illustrate our invention the following examples are given, the parts being by weight and all temperatures in centigrade degrees, but it is understood, that our invention is not limited to the particular products or reacting conditions mentioned therein.

Example 1

A diazosolution prepared in the usual manner from 16.2 parts of 2.5-dichloraniline, is combined with a solution in a dilute caustic soda solution of 27 parts of bis-(2'-hydroxy-3'-naphthoyl)-
2.5-diamino-4-chloro-1-anisole, containing turkey red oil and a sufficient amount of sodium acetate for neutralizing the excess of the mineral acid. The separated dyestuff corresponding probably to the formula

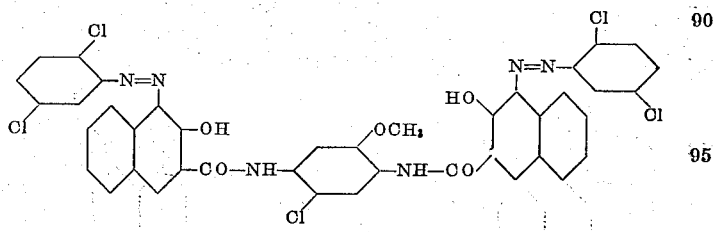

is filtered off and well washed. It represents when dry a dark powder and dissolves in concentrated sulfuric acid with a wine-red tint. It may be advantageously used in form of a paste and yields, when mixed with a substratum in the usual manner, a brown lake of a very good fastness to light.

In order to produce a dyestuff of this kind on the fiber one may proceed as follows:

*Example 2*

Well boiled and dried cotton yarn is impregnated in a solution, containing 5 grs. of bis-(2'-hydroxy-3'-naphthoyl)-2.5-diamino-4-chloro-1-toluene, 10 cc. of a caustic soda solution of 34° Bé. and 8 cc. of Turkey red oil per liter, well wrung out and developed with a diazosolution containing 3.2 grs. of 4-chloro-2-amino-1-anisole per liter and being neutralized with sodium acetate. Then it is rinsed, soaped and dried.

In this manner a red, claret-like dyeing of a good fastness to light and to kier-boiling is obtained.

The dyestuff thus produced on the fiber corresponds probably to the formula

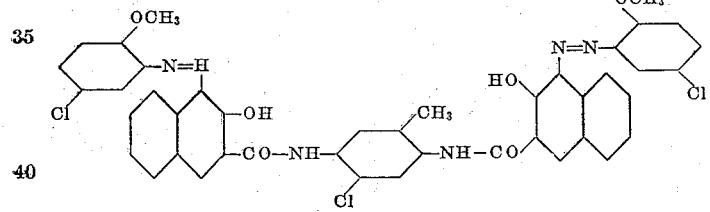

*Example 3*

Cotton material previously treated as usually is padded with a solution containing 4 grs. of bis-(2'-hydroxy-3'-naphthoyl)-2.5-diamino-4-methoxy-1-toluene, 8 cc. of caustic soda solution of 34° Bé. and 8 cc. of Turkey red oil per liter, well wrung out and developed, without being dried, with a diazosolution containing 3 grs. of 4-nitro-2-amino-1-toluene per liter. Then it is rinsed, soaped and dried.

In this manner a garnet brown dyeing of a good fastness to light and to kier-boiling is obtained. The dyestuff thus produced on the fiber corresponds probably to the formula

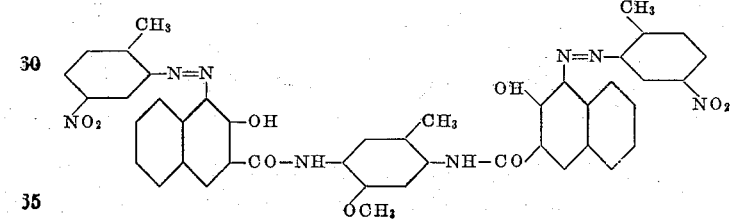

*Example 4*

Cotton yarn previously well treated is padded in the usual manner with a solution containing 5 grs. of bis-(2'-hydroxy-3'-naphthoyl)-2.5-diamino-4-chloro-1-anisole, 10 cc. of caustic soda solution of 34° Bé. and 8 cc. of Turkey red oil per liter, and developed with a diazo solution containing 3.4 grs. of 5-nitro-2-amino-1-anisole per liter.

In this manner a dark garnet dyeing of a good fastness to light is obtained. The dyestuff thus produced on the fiber corresponds probably to the formula

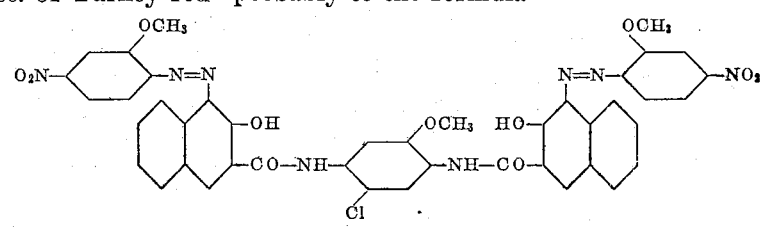

In the same way our process is carried out when starting from other 2-hydroxy-3-naphthoic acid arylamides of the constitution described herein and from other diazo-, tetrazo- or diazoazo-compounds.

The new dyestuffs may also be prepared by the printing process according to one of the usual methods.

The following table shows the shades of some dyeings produced according to our invention:

| Diazocompound from— | Combined with— | Shade |
|---|---|---|
| m-chloroaniline | bis-(2'-hydroxy-3'-naphthoyl)-2.5-diamino-1.4-xylole. | Claret. |
| 2.5-dichloroaniline | ___do___ | Red-brown. |
| 4-chloro-2-toluidine | ___do___ | Claret. |
| 4-nitro-2-toluidine | ___do___ | Red-brown. |
| 5-nitro-2-toluidine | ___do___ | Garnet. |
| 4-nitro-2-anisidine | ___do___ | Yellowish-claret. |
| 5-nitro-2-anisidine | ___do___ | Garnet. |
| 4-chloro-2-anisidine | ___do___ | Claret. |
| o-aminoazotoluene | ___do___ | Dark bluish-garnet. |
| 2.5-dichloroaniline | bis-(2'-hydroxy-3'-naphthoyl)-2.5-diamino-hydroquinonedimethylether. | Yellowish-brown. |
| 3.5-dichloroaniline | ___do___ | Brown. |
| 4-nitro-3-chloroaniline | ___do___ | Dark-brown. |
| m-xylidine | bis-(2-hydroxy-3'-naphthoyl)-2.5-diamino-1.4-dichlorobenzene. | Full red. |
| m-chloroaniline | ___do___ | Yellowish-scarlet. |
| 2.5-dichloroaniline | ___do___ | Yellowish-red. |
| 4-chloro-2-toluidine | ___do___ | Red. |
| 5-chloro-2-toluidine | ___do___ | Full red. |
| 4-chloro-2-anisidine | ___do___ | Claret. |
| 5-nitro-2-toluidine | ___do___ | Yellowish-claret. |
| 3-nitro-4-toluidine | ___do___ | Wine-red. |
| 4-chloro-2-nitroaniline | ___do___ | Brownish-red. |
| 5-nitro-2-anisidine | ___do___ | Garnet. |
| o-aminoazotoluene | ___do___ | Dark-violet. |
| α-aminoanthraquinone | ___do___ | Full red. |
| m-chloroaniline | bis-(2'-hydroxy-3'-naphthoyl)-2.5-diamino-4-chloroanisole. | Brown-red. |
| 5-chloro-2-toluidine | ___do___ | Yellowish-scarlet. |
| 4-nitro-2-toluidine | ___do___ | Brownish-red. |
| α-aminoanthraquinone | ___do___ | Do. |
| m-xylidine | ___do___ | Claret. |
| 4-chloro-2-toluidine | ___do___ | Brownish-red. |
| 4-chloro-2-nitroaniline | ___do___ | Reddish-brown. |
| 4-chloro-2-anisidine | ___do___ | Full claret. |
| 3-nitro-4-toluidine | ___do___ | Garnet-brown. |
| 5-nitro-2-toluidine | ___do___ | Dark reddish-brown. |
| o-aminoazotoluene | ___do___ | Dark brown-garnet. |
| m-xylidine | bis-(2'-hydroxy-3'-naphthoyl)-2.5-diamino-4-methoxy-toluene. | Garnet. |
| 2.5-dichloroaniline | ___do___ | Dark brown. |
| 5-chloro-2-toluidine | ___do___ | Dark brown. |
| 5-chloro-2-anisidine | ___do___ | Garnet. |
| 5-nitro-2-toluidine | ___do___ | Bluish-red. |
| o-aminoazotoluene | ___do___ | Dark-violet. |
| α-aminoanthraquinone | ___do___ | Dark claret. |
| m-chloroaniline | ___do___ | Dark brown. |
| 4-chloro-2-toluidine | ___do___ | Brown-garnet. |
| 4-nitro-2-toluidine | ___do___ | Garnet-brown. |
| 4-chloro-2-nitroaniline | ___do___ | Reddish-brown. |
| 5-nitro-2-anisidine | ___do___ | Dark brownish garnet. |
| 3-nitro-4-toluidine | ___do___ | Dark garnet. |
| Dianisidine (1 mol.) | ___do___ | (After coppered) dark navy-blue. |
| o-phenetole-azo-α-naphthylamine. | ___do___ | Dark violet-bluish black. |
| m-xylidine | bis-(2-hydroxy-3'-naphthoyl)-2.5-diamino-4-chlorotoluene. | Dark-red. |
| m-chloroaniline | ___do___ | Brown-red. |
| 2.5-dichloroaniline | ___do___ | Brownish-red. |
| 4-chloro-2-toluidine | ___do___ | Full red. |
| 5-chloro-2-toluidine | ___do___ | Claret-red. |
| 4-chloro-2-nitroaniline | ___do___ | Dark claret. |
| 4-nitro-2-toluidine | ___do___ | Brownish-red. |
| 5-nitro-2-toluidine | ___do___ | Brown-claret. |
| 3-nitro-4-toluidine | ___do___ | Claret. |
| 5-nitro-2-anisidine | ___do___ | Garnet. |
| o-aminoazotoluene | ___do___ | Dark bluish garnet. |
| α-aminoanthraquinone | ___do___ | Yellowish-claret. |

We wish it to be understood that the term "manufacturing" in the following claims means manufacturing in substance as well as manufacturing on any substratum especially on the vegetable fiber and that the term "diazo-compound" includes also tetrazo- or diazoazo-compounds.

We claim:

1. As new products azo dyestuffs corresponding probably to the general formula

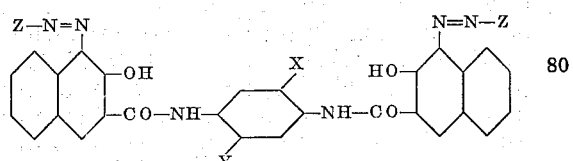

wherein X as well as Y means alkyl, alkoxy or halogen and Z means the residue of any diazo-compound, of the benzene, napthalene or anthraquinone series containing no free sulfonic nor carboxylic acid group, which products are when dry reddish to blackish powders, soluble in concentrated sulfonic acid with a bluish-red to bluish-green color, being suitable for the production of valuable color lakes and yielding, when produced on the vegetable fiber, dark red to black dyeings and printings of a remarkable fastness to light.

2. Textile materials dyed with the dyestuffs claimed in claim 1.

3. As new products azodyestuffs corresponding probably to the general formula

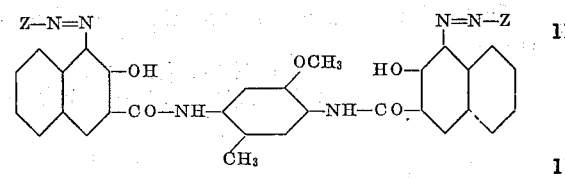

wherein Z means the residue of any diazo-compound of the benzene, napthalene or anthraquinone series containing no free sulfonic nor carboxylic acid groups, which products are when dry reddish to blackish powders, suitable for the production of valuable color lakes and yielding, when produced on the vegetable fiber red to brown dyeings and printings of a remarkable fastness to light.

4. Textile materials dyed with the dyestuffs claimed in claim 3.

5. As new products, azo-dyestuffs corresponding probably to the general formula

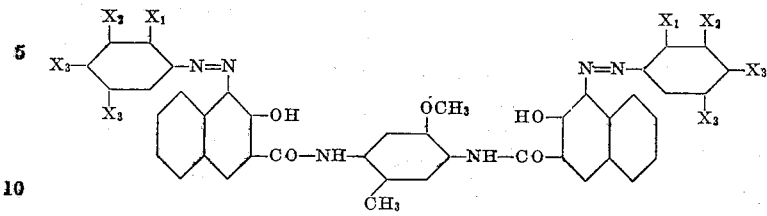

wherein $X_1$, $X_2$ and $X_3$ mean hydrogen atoms of which one or two may be replaced by halogen, a nitro-, methyl- or alkoxy-group, which products are when dry reddish to blackish powders, suitable for the production of valuable color lakes and yielding, when produced on the vegetable fiber, red to brown dyeings and printings of a remarkable fastness to light.

6. Textile materials dyed with the dyestuffs claimed in claim 5.

7. As new products, azo-dyestuffs corresponding probably to the general formula

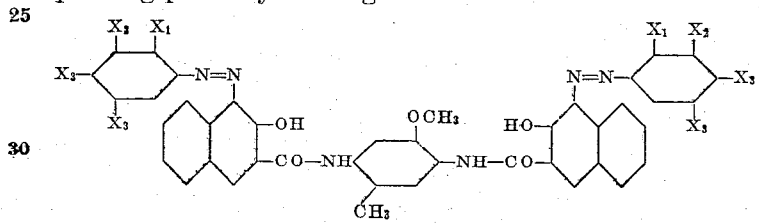

wherein $X_1$ means $CH_3$ or $OCH_3$ or hydrogen, $X_2$ hydrogen or chlorine or $CH_3$ one $X_3$ hydrogen and the other $NO_2$, but at least two of the four X's being hydrogen, which products are when dry reddish to blackish powders, suitable for the production of valuable color lakes and yielding, when produced on the vegetable fiber, red to brown dyeings and printings of a remarkable fastness to light.

8. Textile materials dyed with the dyestuffs claimed in claim 7.

In testimony whereof, we affix our signatures.

LEOPOLD LASKA.
ARTHUR ZITSCHER.